United States Patent [19]

Stamatiou et al.

[11] 4,128,404

[45] Dec. 5, 1978

[54] METHOD FOR SEPARATING LIGHT-WEIGHT COMPRESSIBLE MATERIAL

[75] Inventors: Dimitri S. Stamatiou; Lila D. Stamatiou, both of Kansas City, Mo.

[73] Assignee: Pneumatic Force Feeder, Inc., Kansas City, Mo.

[21] Appl. No.: 858,480

[22] Filed: Dec. 8, 1977

Related U.S. Application Data

[62] Division of Ser. No. 677,504, Apr. 15, 1976, abandoned.

[51] Int. Cl.² .............................................. B01D 45/12
[52] U.S. Cl. .............................................. 55/1; 65/2; 264/37; 264/121
[58] Field of Search ................. 264/37, 121; 55/1, 97, 55/337, 294, 302, 403, 338, 430, 428; 65/4 R, 27, 28, 2 R, 62; 198/676; 222/413, 564

[56] References Cited

U.S. PATENT DOCUMENTS

| | | | |
|---|---|---|---|
| 2,736,141 | 2/1956 | Silverman et al. | 65/2 |
| 2,888,375 | 5/1959 | Drummond | 65/4 R |
| 3,496,601 | 2/1970 | McGill | 198/676 |
| 4,054,434 | 10/1977 | Thomas et al. | 65/2 |

*Primary Examiner*—Frank Sever
*Attorney, Agent, or Firm*—Lowe, Kokjer, Kircher, Wharton & Bowman

[57] ABSTRACT

A method and apparatus for removing a resiliently compressible material from an air stream is the subject of the present invention. By utilizing a screw conveyor within a cyclone separator, the material is first separated and then removed. As a result of compaction, removal from the separator is facilitated and subsequent handling is made practical as a result of the increased density. The screw conveyor is provided with flights of increasing size to conform generally to the configuration of the cyclone separator. Baffle plates on the cyclone itself tend to scrape the material off the screw conveyor. The invention also contemplates passing the compacted material through an air lock and into a pneumatic conveying path. To this end, a multiple compartment air lock wheel is placed with its axis perpendicular to the axis of the screw conveyor for receiving material from the latter. Another feature of the invention is the use of novel screening means within the separator to filter the separated air stream. The screening means includes structure for cleaning adhering material from the screen. The cleaning structure may take the form of rotating air nozzles inside the screening means, wiper blades on the outside of the screening means or a combination of these two. A third cleaning means employs rotation of the screening means at a high speed. The interior of the screening means is compartmentalized and a gate is employed to periodically block the flow of air through each compartment so that the centrifugal force from the rotating screen will throw off adhering material. This feature of the invention is applicable to all types of centrifugal separators.

2 Claims, 7 Drawing Figures

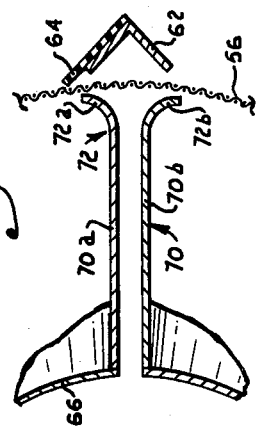
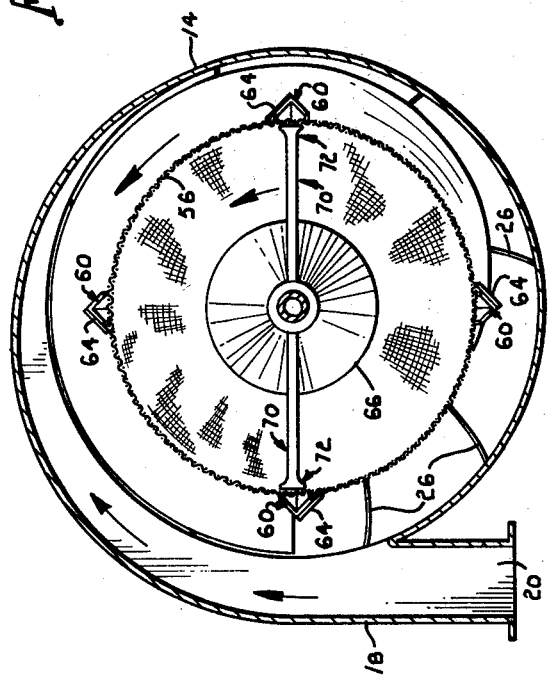
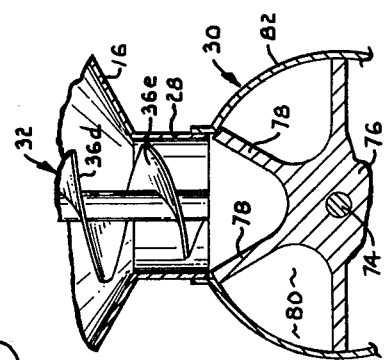
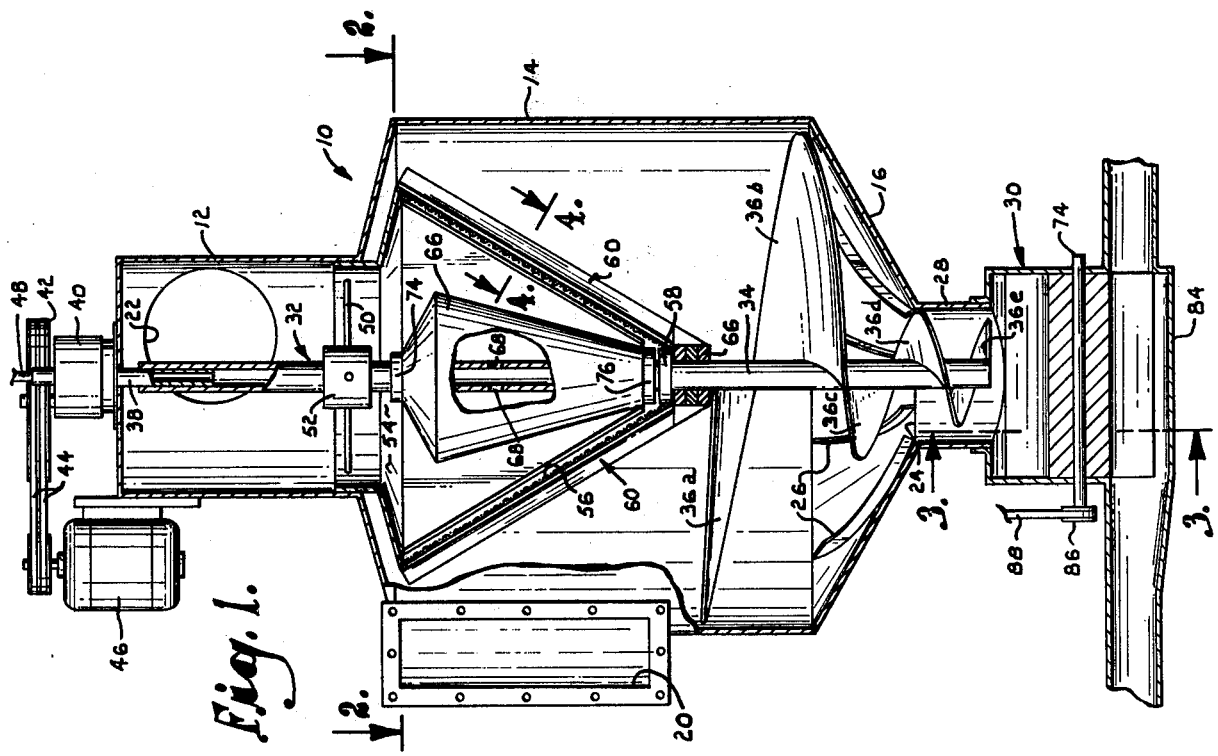

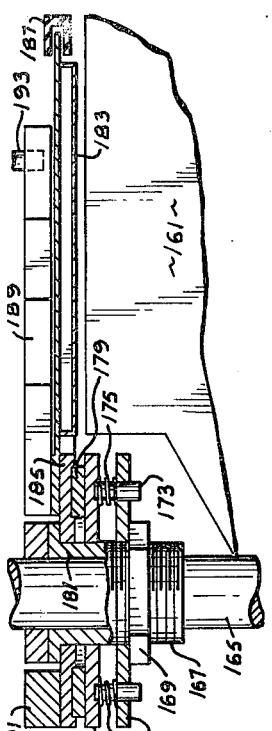
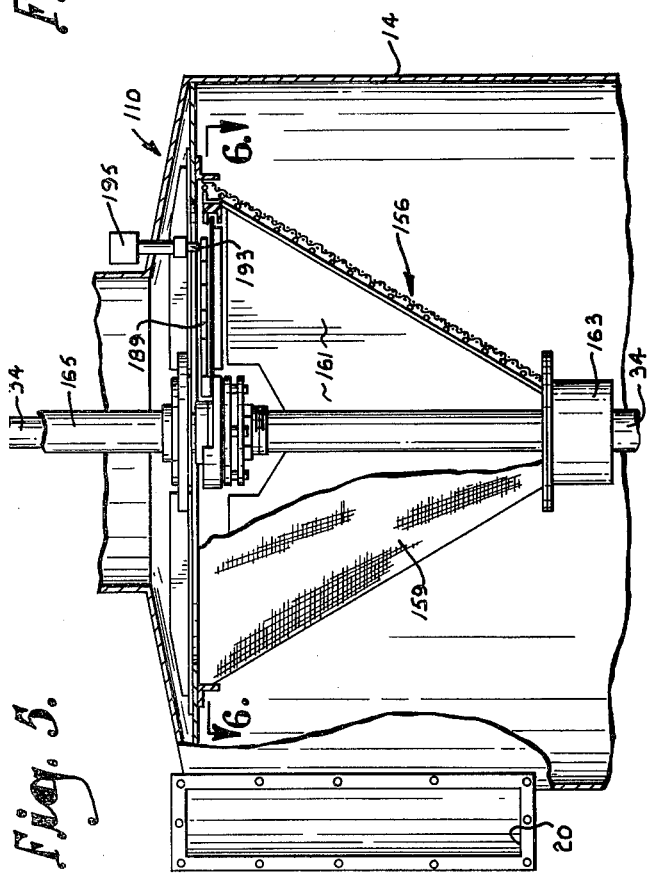
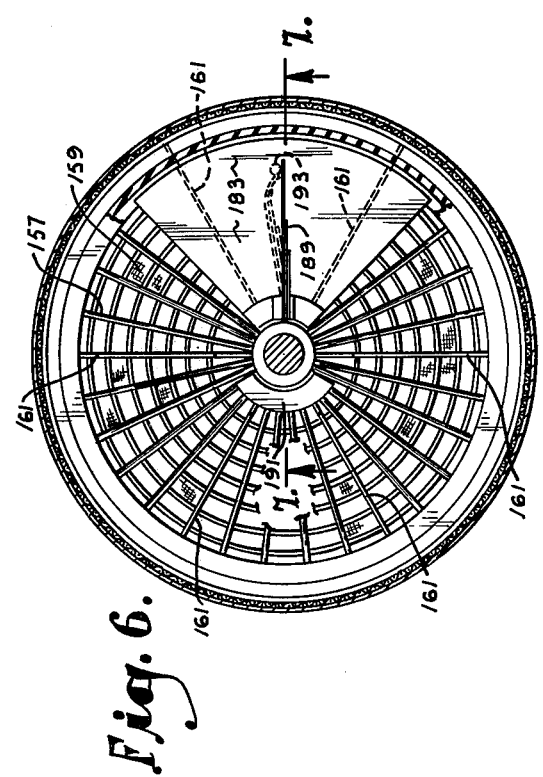

METHOD FOR SEPARATING LIGHT-WEIGHT COMPRESSIBLE MATERIAL

This is a division of application Ser. No. 677,504, filed Apr. 15, 1976, now abandoned.

This invention relates to a method and apparatus for handling resiliently compressible materials and, more particularly, to a method and apparatus for separating such a material from an air stream and for conveying the separated material pneumatically.

In many industries the handling of light, fluffy material characterized by a low specific gravity and an aerodynamically unstable configuration is a problem. It has been found, however, that when such a material is also characterized by being compactible, even though only resiliently so, it may be efficiently and economically handled using pneumatic conveying and separating equipment.

It is, therefore, an object of the present invention to provide a method and apparatus for handling a material of low specific gravity which is also resiliently compressible, which method and apparatus may utilize a centrifugal separator, such a cyclone separator, thereby avoiding rotating drums which have heretofore been required and which are more expensive to operate and maintain.

As a corollary to the above object, an aim of the invention is to provide a method and apparatus for handling material of the type described wherein the problem of material bridging within the separator is substantially eliminated through the use of compacting means which compresses the material while forcing it through the separator outlet.

Another important objective of this invention is to provide a method and apparatus for handling material of the type described wherein pneumatic conveying of the material is greatly facilitated as a result of compaction immediately after separation from an air stream.

Another difficulty in handling material of the type described utilizing prior art techniques has been the inability to recover substantially all of the material from an air stream. The character of the material is such that even when it is passed through a rotating drum or the like a substantial portion of the material remains entrained in the stream.

It is, therefore, an important object of the present invention to provide a method and apparatus for separating material of the type described from an air stream wherein the percentage of material recovered is up to ten percent greater than previously possible as a result of utilization of filtering means in combination with a centrifugal separator.

It is also one of the objects of this invention to avoid the problems of cleaning out dust collectors and filtering equipment heretofore used to handle material of the type described above by providing a method and apparatus which incorporates structure within the air stream cleaning means that automatically and mechanically cleans the screening means.

Still another important object of the invention is to provide a method and apparatus as described in the foregoing object wherein atmospheric pollution is minimized and substantially eliminated as a result of superior separating means and the combining of the separating means with novel screening means for the air stream.

It is another one of the objectives of our invention to reduce the wear which has heretofore occurred in fans used for the pneumatic conveying of material of the type described by providing for separator means which yields superior separation of the material from the air stream and the combination with this separator of screening means which removes nearly all of the material from the air stream.

A further object of the invention is to provide for more efficient energy utilization in handling material of the type described and separting this material from an air stream by providing for better separation through the utilization of a combination separator screening device thereby reducing the build up of material entrained in the air stream on the fan which produces the conveying air stream.

An object of the invention is also to provide for more economical pneumatic conveying of material of the type described as a result of compaction of the material into a more dense mass thereby permitting a smaller conduit to define the pneumatic conveying path with an attendant savings in energy requirements.

Another important aim of the invention is to eliminate the need for the use of oils or other condensates at the terminai end of an air stream utilized to move material of the type described, the elimination being attributable to superior separation and filtering accomplished in the combination separator-filter of this invention.

Other objects of the invention will be made clear or become apparent from the following description and claims when read in light of the accompanying drawing, wherein:

FIG. 1 is a vertical, sectional view through the combination separator-screening structure which forms a part of the present invention;

FIG. 2 is a horizontal, cross-sectional view taken along line 2—2 of FIG. 1;

FIG. 3 is a vertical, cross-sectional view, on an enlarged scale, taken along line 3—3 of FIG. 1;

FIG. 4 is a substantially horizontal, cross-sectional view, on an enlarged scale, and taken along line 4—4 of FIG. 1;

FIG. 5 is a fragmentary, vertical, cross-sectional view, similar to FIG. 1, and illustrating a modified form of the invention;

FIG. 6 is a horizontal, cross-sectional view taken along line 6—6 of FIG. 5; and FIG. 7 is a vertical, sectional view, on an enlarged scale, taken along line 7—7 of FIG. 6.

Referring initially to FIG. 1, a cyclone separator is designated generally by the numeral 10 and comprises a generally cylindrical head section 12, a generally cylindrical separating chamber 14 and frustoconically configured collection chamber 16. As best illustrated in FIG. 2, a curvilinear conduit 18 merges into chamber 14 at one end and extends tangentially away from the chamber at the other end to present an inlet opening 20 to the chamber. An opening 22 in section 12 provides an outlet for the air stream passing through chamber 14. A material discharge is presented by an opening 24 in the bottom of collection chamber 16. Chamber 16 is also characterized by a plurality of radially spaced curvilinear baffle plates 26, the function of which will be described in detail hereinafter.

Discharge opening 24 communicates with a feeder passageway defined by a conduit 28. This passageway in turn communicates with an air lock which is designated generally by the numeral 30.

Disposed in concentric relationship with chamber 14 is a screw conveyor 32 which comprises a shaft 34 with a plurality of spirally extending conveyor flights 36 secured thereto. The conveyor flights are designated by reference letters 36a through 36e and it will be appreciated from viewing the drawing that each successive flight down the shaft is of slightly smaller area than the next preceding flight. Thus, the flights conform generally to the converging configuration of chamber 16 and each flight merges into the next succeeding flight to present a continuous conveying surface.

Shaft 34 is driven through a drive rod 38 which is coupled with reduction gearing 40 that is turned by a double drive pulley 42 through belts 44. Belts 44 are, of course, turned by a motor assembly 46. Shaft 34 is hollow and an air. line 48 is coupled wth the conduit formed by the shaft for purposes to be made clear thereinafter. Shaft 34 is held in place within separator 10 by a tripod brace 50 which extends inwardly from the sides of section 12 to a bearing bushing 52 that receives the shaft. The individual legs of brace 50 are, of course, adjustable to obtain a balanced operating condition.

Disposed partially inside of section 12 and depending therefrom is a mounting skirt 54 which supports a perforated frustoconically configured screening element 56. A bushing 58 which is rigid with element 56 is disposed at the converging end of the latter to mount the screen on shaft 34 and permit the latter to turn inside of the bushing.

Disposed immediately outside of screening element 56 are a pair of rotatable wiping blades 60. Details of construction of each of the blades 60 is best illustrated with reference to FIG. 4. Each blade comprises a generally V-shaped angle iron support 62 which mounts a flexible wiping element 64 disposed on one surface of support 62 and extending beyond the surface into contact with screening element 56. Each of the angle iron supports is rigid with a mounting ring 66 which is keyed to shaft 34 for rotation therewith.

Disposed inside of screening element 56 is a generally frustoconically configured air surge tank 66. The interior of tank 66 is in communication with the conduit portion of shaft 34 by virtue of apertures 68 in the shaft. As best illustrated in FIG. 4, at each side of tank 66, spaced 180° apart, are two directional fins 70 presented by spaced apart walls 70a and 70b. Each of the fins 70 extends substantially the entire length of screening element 56 and each is of decreasing width to conform to the configuration of element 56. Walls 70a and 70b terminate in outwardly flared sections 72a and 72b which present a directional nozzle 72 immediately adjacent screening element 56 on the inside of the latter. Surge tank 66 is stationary mounted relative to shaft 34 by appropriate bushings 74 and 76 at the top and bottom of the tank.

Referring now to FIGS. 1 and 3, details of construction of air lock 30 will be described. An elongated rotor 74 mounts a wheel 76 characterized by a plurality of radially extending arms 78 that cooperate to define a plurality of compartments 80 therebetween. A cylindrical housing 82 partially encases the wheel and arms and communicates with the passageway presented by conduit 28 as well as the passageway presented by a second conduit 84 immediately beneath rotor 74. Rotor 74 is turned by a drive pulley 86 and belt 88, the latter being coupled with an appropriate size motor.

The foregoing apparatus is used for handling light, fluffy material characterized by a low specific gravity and an aerodynamically unstable configuration. Material of this type is normally compressible, at least to some degree, although in many cases, the material will be resiliently compressible, i.e., it will have a tendency to return to an uncompacted volume once the compressive force tending to compact it is released. Material of the type described is also often of a fibrous character and may be man-made as well as naturally occurring. Examples of the types of material with which the present invention is intended to be used are fiberglass, rock wool, cotton, wool, urethane foams, excelsiors, cellulose-base materials, and products made from any of the foregoing. By way of example only, the use of the apparatus will be described with reference to the handling of scrap fiberglass in a plant which produces fiberglass insulation. It is necessary in the production of fiberglass insulation bats to trim the bats to a desired width. It is known in the industry to collect the trimmings and feed same into a comminuter such as a hammer mill where they are reduced to a uniform size and configuration. The comminuted material is then fed pneumatically to a processing location where it is separated from an air stream and packaged or returned for further processing steps. Separation of this type of material has heretofore been achieved only through the utilization of a centrifugal separator in the form of a rotating drum or subterfuge. Equipment of this type is difficult and expensive to maintain as a result of the number of moving parts and the large weight which must be moved. Even when the equipment is operating properly, separation of material of the type described from an air stream is only partially effected and a large quantity of the material remains entrained in the dust stream.

The material which remains in the dust stream is often partially further removed by filtering, screening or separating by other means. This type of separation is subject to further maintenance requirements and the final separated dust cannot be efficiently recycled but instead is discarded. In addition, the fact that substantial material remains in the air stream has a detrimental abrasive effect on the air moving equipment.

With the foregoing described apparatus of the present invention, trimmings from the fiberglass batting production line are fed into a comminuter such as a hammer mill and after being reduced to uniform size advanced pneumatically to a location for further processing. The apparatus of the present invention is utilized to effectively and economically separate the comminuted fiberglass material from the air stream which is conveying it. To this end, the conveying air stream is directed into inlet 20 of cyclone separator 10 where separation of the material and the air stream is achieved. Because of the physical characteristics of the material, it is not practical to simply rely upon gravity to draw the separated material out of the cyclone. Thus, as separation is achieved in chamber 14, the separated material is advanced downwardly by screw conveyor 32. As a result of the decreasing cross-sectional area of chamber 16 as the material is advanced toward opening 24, the material will be compressed and compacted by the action of the conveyor flights. This accomplishes two things. First of all, the compressive compacting action prevents bridging in chamber 16 which would stop discharge of material altogether. It also enhances the rate of removal of the separated material from the chamber thereby accommodating much greater air flow volumes through separating chamber 14. Second, by virtue of compression of the material into a smaller mass of greater density than would otherwise be the case, it is possible to pneumatically convey the separated material much more efficiently and economically. That is, as a result of compaction and compression of the separated material, a smaller conduit 84 may be utilized to receive the separated material and pneumatically convey it to the next station than would be possible if the material remained in its natural fluffy, light aerodynamically unstable configuration. Thus, the compacted material is received by the compartments 80 of air lock 30 and delivered into conduit 84 where it is pneumatically conveyed to the next location.

Separation of the fiberglass within chamber 14 is also enhanced as a result of screening element 56. Manifestly, this element is located ahead of outlet opening 22 so that the air stream passing to outlet 22 must first pass through the screening element. This separates any fine material which may still be entrained within the air stream notwithstanding the centrifugal forces which separate the bulk of the material as it travels around chamber 14. The volume of material which is screened out by element 56 is such that it is necessary to periodically clean the screen to maintain optimum operating efficiency. To this end, a blast of air is periodically introduced through line 48 and surge tank 66 to the rotating nozzles 72 that are adjacent the interior of screening element 56. The nozzles will tend to blow any adhering material away from the screen and cause it to fall to the bottom of the chamber where it will be joined with the other separated material and removed through the discharge opening.

In some cases it may be desirable to employ wiper blades 60 to further facilitate cleaning of the screening element 56. The wiper blades are rotated so that wiping elements 64 which, of course, are made of a flexible material will actually contact the screening element and clean any adhering material from it. It will be appreciated by those skilled in the art that wiping blades 60 and the air cleaing device may be used in combination with each other or separately.

It should also be mentioned that material of the type described for which the apparatus of the present invention is particularly adapted will frequently have a very low coefficient of friction which will increase as the material is compacted and compressed. This may result in a tendency for the material to adhere to the conveyor flights as it is moved toward and through the discharge opening 24. To prevent excessive build up of material on the conveyor flights, baffle plates 26 are provided which have a radius of curvature that is generally opposed to the radius of curvature of the individual conveyor flights. Thus, each of the baffle plates 26 extends through a radius which intersects the radius of curvature of an adjacent conveyor flight as the latter passes over the plate. This causes a force counter to the force of the rotating conveyor flights to be exerted against the compressed and compacted material, thereby effectively dislodging it from adhering to the conveyor flights.

Referring now to the alternative embodiment of the invention which is illustrated in FIGS. 5–7, like reference numerals are used to indicate substantially similar components with the embodiment shown in FIGS. 1–4. Thus, cyclone separator 10 has a separating chamber 14, an inlet opening 20 and a conveyor shaft 34 disposed therein. This embodiment of the invention differs primarily in the provision of a screening element 156 which may be constructed of perforated sheet material such as that shown in FIGS. 1 and 2 or from a reinforcing cage 157 covered with a wire mesh screen 159. Manifestly, the screening element is of generally frustoconical configuration and the interior is divided into a plurality of compartments by divider walls 161. Each wall 161 is of generally pie-shaped configuration and extends substantially the entire length of screening element 156. The entire assembly is mounted on bearing collar 163 which is rigid with a drive sleeve 165 that is rotatably mounted on drive shaft 34. Sleeve 165 is driven by a power drive assembly (not shown) including a motor and an appropriate drive coupling.

Referring particularly now to FIG. 7, it is seen that sleeve 165 is provided at a location intermediate its ends with a threaded sleeve fitting 167. This fitting is rigidly affixed to sleeve 165 for rotation therewith. Threadably received on fitting 167 is a complementarily threaded collar 169 having rigid therewith an apertured pressure plate 171. Pressure plate 171 is fitted with a plurality of through pins 173 which mount coiled springs 175. One end of each of the pins 173 is also received by a bearing plate 177. Plate 177 has rigidly affixed to it on the side opposite pins 173 a braking element 179 formed from asbestos or other suitable braking material.

Also rigidly affixed to drive sleeve 165 is a collar 181 which mounts a compartment closing gate 183. A conact element 185 is rigidly affixed to collar 181 for engagement by braking element 179. The peripheral end of gate 183 rides in a generally U-shaped track 187 that extends around the upper peripheral edge of screening element 156. As seen from viewing FIG. 6, gate 183 is shaped similarly to a pie segment and extends over an area approximately 50 percent greater than the surface area between two compartment walls 161.

Rigidly mounted on the upper surface of gate 183 is a leaf spring 189 which extends radially for a distance approximately equal to the radial span of the gate. Immediately opposite gate 183 and also carried by collar 181 is a counterweight 191. Mounted at the top of chamber 14 in a position aligned with the circumferential path of the outermost end of spring 189 is a stop pin 193 which is movable into and out of a position where it will be struck by spring 189. Pin 193 is operated by a timer controlled solenoid 195.

In operation of the above-described alternative embodiment of the invention, an air stream carrying a material to be separated is introduced into separator 110. As the air stream passes through the separator, it will be filtered by screening element 156 and material may adhere to the screen causing some air blockage which will reduce operating efficiency. To keep the screening element clean, it is continuously rotated at a speed of at least 350 r.p.m. and preferably about 500 r.p.m. so that the resulting centrifugal forces will throw material adhering to the screening element away from it. This, of course, will not occur so long as air is being pulled through the screening element as a result of a negative atmospheric operating pressure within the system. Thus, gate 183 is rotated with the screening element in a position overlying one of the compartments to block the flow of air through this compartment and permit the centrifugal forces to free any adhering material. Upon receiving a signal from a timing mechanism (not shown), solenoid 195 extends pin 193 into the broken line position shown in FIG. 7 where the pin will be struck by leaf spring 189. As leaf spring 189 strikes the pin, it will flex to a certain degree as indicated by the broken line position of the spring in FIG. 6. This absorbs some of the shock of the forces encountered upon contact and prevents damage to the equipment. Pin 193 remains extended only for a short period of time to hold gate 183 relative to the rotating screen element 156. Limited movement of the screen element relative to the gate is accommodated by braking element 179 which normally holds the two in rigid relationship for rotation together but upon extension of pin 193, allows some relative movement. In this regard, it will be appreciated that the threaded coupling between collar 169 and fitting 167 permits adjustment of the tension on springs 175 and accordingly the resistence offered by braking element 179.

By periodically extending pin 193 at regular time intervals, gate 183 is periodically held against rotation, thus moving a different compartment beneath the gate. When the gate is again released this compartment will be blocked from the flow of air therethrough and the centrifugal forces attributable to the rotating screening element will clean that section of the screen adjacent the particular compartment. Manifestly, this presents a highly efficient cleaning mechanism which is virtually maintenance free.

We claim:

1. A method of recovering fiberglass trimmings from a fiberglass bats manufacturing process, said method comprising the steps of:
   (a) Collecting said trimmings,
   (b) Fracturing said trimmings to provide glass fibers of a substantially uniform size,
   (c) Air blowing said fibers over a minor distance to a separation device comprising a compaction means,
   (d) Removing air from said fibers and compacting said fibers in said device sufficient to form agglomerated particles,
   (e) Air conveying said agglomerated particles over a major distance to said process for reuse therein.

2. A method as set forth in claim 1, whereby said air conveying is conducted through an air lock means.